United States Patent
Butera et al.

(10) Patent No.: US 7,198,248 B2
(45) Date of Patent: Apr. 3, 2007

(54) VALVE FOR FLUIDS, LIQUIDS OR POWDER MATERIAL HAVING A DIAPHRAGM SHUTTER CONTROLLED BY SHAPE MEMORY MEANS

(75) Inventors: Francesco Butera, Turin (IT); Stefano Alacqua, Rivoli Cascine Vica (IT); Marco Biasiotto, Turin (IT); Alessandro Zanella, Turin (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 11/244,388

(22) Filed: Oct. 6, 2005

(65) Prior Publication Data

US 2006/0091342 A1   May 4, 2006

(30) Foreign Application Priority Data

Oct. 28, 2004   (EP) ................. 04425810

(51) Int. Cl.
*F16K 31/64* (2006.01)
(52) U.S. Cl. .................... 251/11; 251/335.2
(58) Field of Classification Search ............ 251/11, 251/331, 335.2
See application file for complete search history.

(56) References Cited

U.S. PATENT DOCUMENTS 3,974,849 A     8/1976  Dawson
5,058,856 A  * 10/1991  Gordon et al. ............. 251/11
5,325,880 A  *  7/1994  Johnson et al. ............ 251/11
5,345,963 A  *  9/1994  Dietiker ................... 251/11
5,785,295 A  *  7/1998  Tsai ........................ 251/11
6,131,879 A  * 10/2000  Kluge et al. .............. 251/11
2002/0171055 A1 11/2002 Johnson et al.

OTHER PUBLICATIONS

Patent Abstracts of Japan, vol. 010, No. 153, Jun. 3, 1986 & JP 61 006470 A, Jan. 13, 1986.
Patent Abstracts of Japan, vol. 011, No. 082, Mar. 12, 1987 & JP 61 236974, Oct. 22, 1986.
Patent Abstracts of Japan, vol. 008, No. 220, Oct. 6, 1984 & JP 59 103088, Jun. 14, 1984.

* cited by examiner

*Primary Examiner*—John Bastianelli
(74) *Attorney, Agent, or Firm*—Nixon & Vanderhye P.C.

(57) ABSTRACT

A valve for gases, liquids or powdery material, comprises a diaphragm shutter element having a central part and a peripheral edge connected, respectively, to a central support and to a peripheral support. Said supports can be displaced axially with respect to one another between a first relative end position and a second relative end position corresponding, respectively, to the open condition and to the closed condition of the valve, or vice versa. The relative displacement in the axial direction of said first and second supports is controlled by shape-memory means, preferably formed by a first shape-memory wire and a second shape-memory wire set on the two opposite faces of the diaphragm shutter element.

7 Claims, 3 Drawing Sheets

VALVE FOR FLUIDS, LIQUIDS OR POWDER MATERIAL HAVING A DIAPHRAGM SHUTTER CONTROLLED BY SHAPE MEMORY MEANS

BACKGROUND OF THE INVENTION

The present invention relates to the field of valves for gases, liquids or powdery material.

The purpose of the invention is to provide a valve of the type specified above, which will have an extremely simple and low-cost structure and which will even so be efficient in its operation.

SUMMARY OF THE INVENTION

In order to achieve said purpose, the subject of the present invention is a valve comprising a diaphragm shutter element having a central part and a peripheral edge, which are mobile axially with respect to one another between a first relative end position and a second relative end position, which correspond, respectivly, to the open condition and to the closed condition of the valves, or vice versa, and shape-memory actuator means for controlling the position of said center part and of said peripheral edge with respect to one another.

In the preferred embodiment, connected to the central part and to the peripheral edge of the diaphragm shutter element are, respectively, a first support and a second support, and said shape-memory means are set between said supports. Once again in the case of the preferred embodiment, the diaphragm shutter element is found in a stable resting configuration in each of the two aforesaid relative end positions of said central part and of said peripheral edge. Preferably, moreover, the shape-memory actuator means comprise first shape-memory actuator means for displacing the diaphragm towards the aforesaid first relative end position and second shape-memory actuator means for displacing the diaphragm towards said second relative end position. In the case of said preferred embodiment, the diaphragm is shaped so as to present a configuration of intermediate dead centre between the two relative end positions of the peripheral edge and of the central part. When the diaphragm is moved away from the configuration corresponding to the first end position, it tends of course to be displaced into the opposite configuration, corresponding to the second relative end position, once it has exceeded the intermediate dead-centre configuration. Consequently, in said preferred embodiment, said first and said second shape-memory actuator means are able to bring about each displacement of the diaphragm from one configuration to the other simply by moving it away from the starting position until it exceeds the intermediate dead-centre configuration.

A particularly advantageous application of the valve according to the invention is to the control of the passage of air in a position corresponding to an opening for ventilation of the type, for example, used in the cabs of lorries. However, the application of the valve according to the invention is altogether general and extends also to the field of gases, liquids or powdery materials.

It is also possible to think of a valve built in compliance with the teachings of the present invention, which will have a monostable diaphragm shutter element, instead of a bistable one, as in the case of the preferred embodiment. This means that the diaphragm shutter element is found in a resting condition only in one of the two aforesaid relative end positions of the central part and of the peripheral edge of the diaphragm. The shape-memory actuator means are pre-arranged for displacing the shutter element into the opposite position, and there may be, for example, provided elastic means tending to recall the diaphragm shutter element into the resting condition when activation of the shape-memory means ceases.

Once again in the case of the preferred embodiment, the first and second shape-memory means are each constituted by a wire formed by a shape-memory alloy set on a respective face of the diaphragm shutter element, so as to engage two diametrically opposite areas of the peripheral edge thereof, as well as the central part of the diaphragm. The shape-memory wire is activated by causing it to be traversed by electric current. In the activated condition, the shape-memory wire tends to cause the diaphragm to exceed its dead-centre configuration. Advantageously, the wire pre-arranged on each of the two faces of the diaphragm can be made to turn back in the form of a U, with two parallel branches, so as to present its two opposite ends adjacent to one another, on the same side of the diaphragm, for a more convenient connection with electrical-supply means. Said means are responsible for heating the wire by the Joule effect, which brings about an increase in temperature thereof until the transition temperature is exceeded at which contraction of the wire occurs.

Of course, the electrical supply of the first and second shape-memory means is advantageously controlled by electronic-control means that activate selectively the first and second shape-memory means following upon an intervention of the operator on control means that control the valve.

Also envisaged is the case of a monostable diaphragm shutter element, which is moved away from the resting position by means of a proportional control of the electric current supplied to the shape-memory wire for the purpose of positioning the shutter element in a variable way, with a closed-loop control performed on the basis of a feedback signal constituted, for example, by a signal indicating a parameter, such as the temperature of the wire, the position of the shutter element or of the wire, the electrical resistance of the wire, or the current supplied.

BRIEF DESCRIPTION OF THE DRAWINGS

Further characteristics and advantages of the invention will emerge from the ensuing description, with reference to the annexed drawings, which are provided purely by way of non-limiting example and in which.

DETAILED DESCRIPTION OF THE INVENTION

Figure 1:
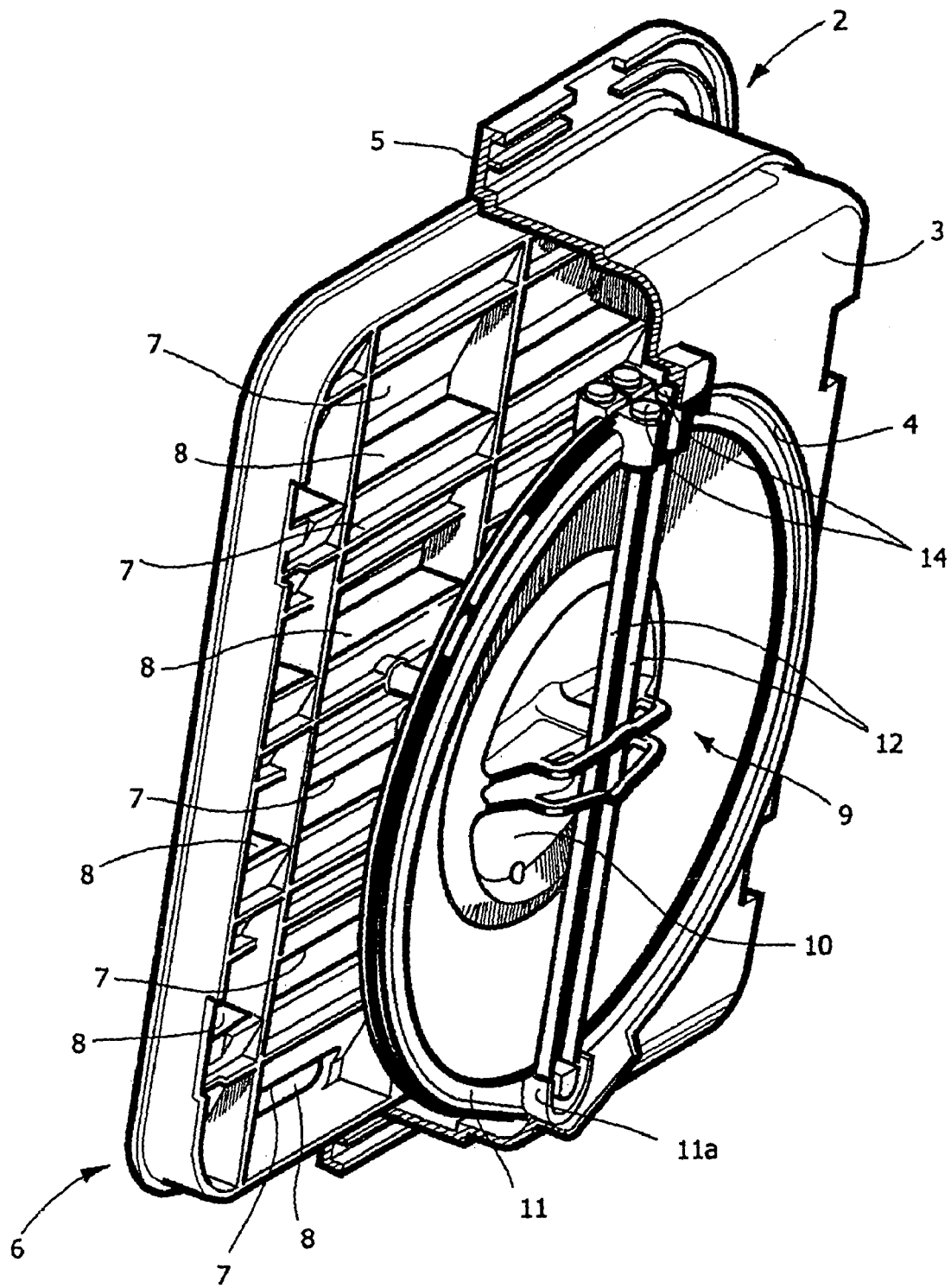
FIG. 1 is a partially sectioned perspective view of an opening for the ventilation air in the cab of a lorry, which is provided with a valve according to a preferred embodiment of the invention.

With reference to the drawings, number 1 designates as a whole an opening designed to enable outlet of the ventilation air from the cab of a lorry. Of course, the example given herein has no limiting effect on the applicability of the invention, which is altogether general. The valve according to the invention can in fact be associated to any type of opening or passage for air in any type of device or else can be used as a valve for liquids or for powdery material, in any suitable application.

With reference to the specific example, the opening 1 comprises a shell or casing 2 made of plastic material having a box-like conformation, with an end wall 3 having a circular opening 4 and an opposite open side having a perimetral edge 5 in a position corresponding to which there is mounted a frame 6 with a plurality of parallel fins 7 set at a distance apart from one another, rigidly connected to the frame 6 and defining between them slits 8 for exit of the air coming from the cab of the lorry. Obviously, as has been said, an opening or louver of the type illustrated herein could be used also as ventilation outlet in buildings or premises of any type, such as, for example, greenhouses or industrial sheds. Communication through the opening 4 is controlled by a diaphragm shutter element 9, comprising a membrane made of rubber with a central part fixed to a first support 10 and a peripheral sealing edge, which is fixed to an annular support 11 and is able to ensure sealing in an area corresponding to the edge of the circular opening 4. The rubber diaphragm 9 is deformable so as to enable a relative axial displacement of the peripheral support 11 with respect to the central part 10, which is connected rigidly, by means of supporting rods 10a, to the structure of the frame 6. The peripheral support 11 is consequently displaceable axially, with respect to the casing 2 of the opening, between a first operative position, illustrated in FIG. 2, in which the peripheral edge 9a of the diaphragm 9 ensures tightness in an area corresponding to the opening 4, and an opposite position (FIG. 3), in which the annular support 11 is set at an axial distance apart from the opening 4 so that the air is free to pass through said opening and to come out through the slits 8. The rubber diaphragm 9 has a dead-centre configuration, so that when it is moved away from one of its two opposite configurations, illustrated in FIGS. 2 and 3, it is displaced as a result of its own elasticity towards the other configuration, once the dead centre is exceeded.

Figure 2:
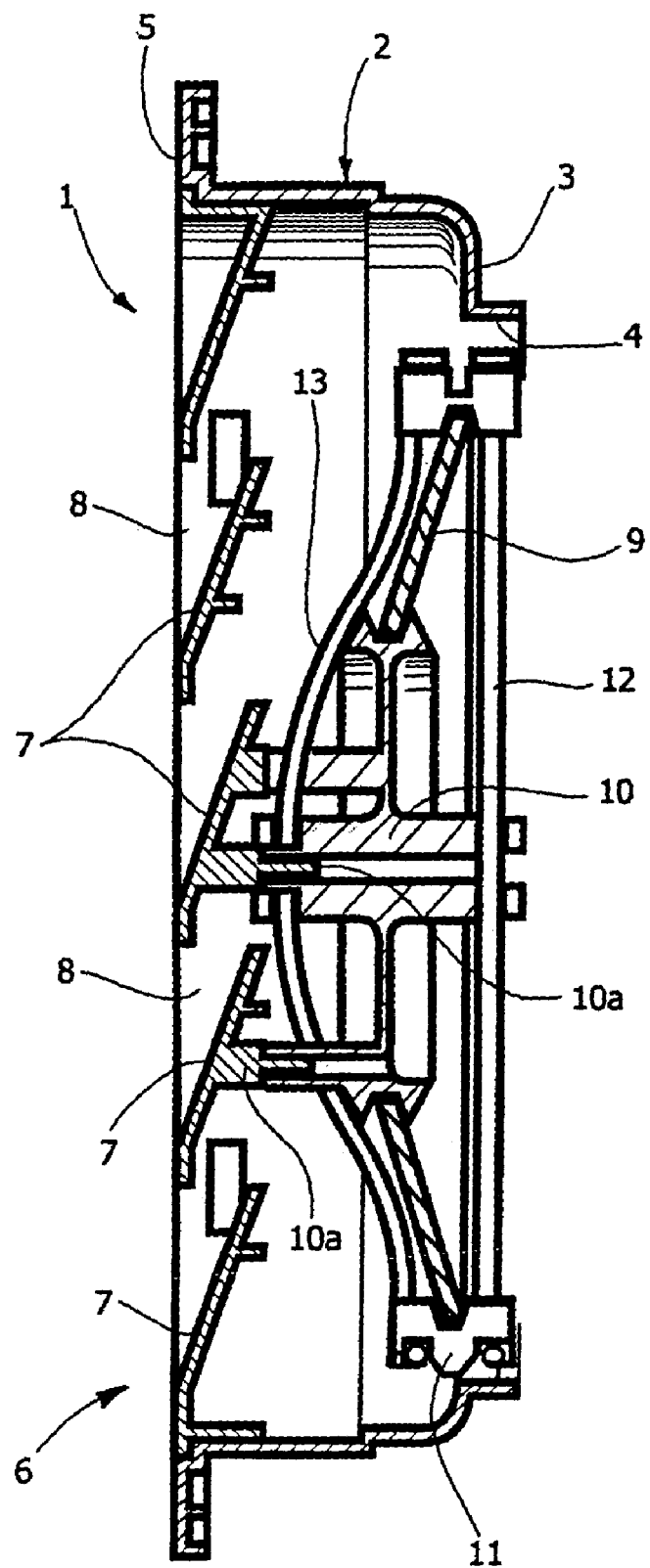
FIGS. 2 and 3 are cross-sectional views of the opening of FIG. 1 in two different operative conditions.
Figure 3:
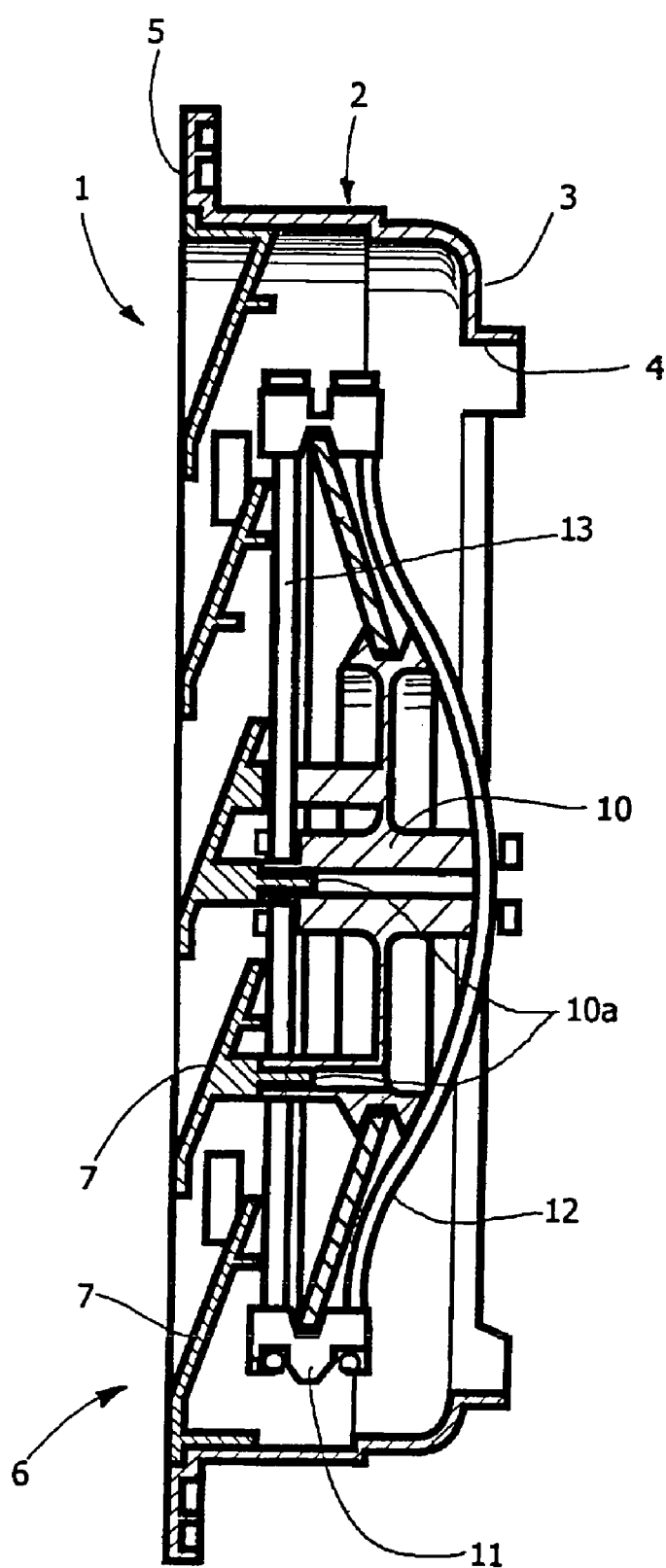

Movement of the diaphragm shutter element 9 between the two extreme conditions illustrated in FIGS. 2 and 3 is controlled by means of a first wire and a second wire, which are made of a shape-memory metal alloy and are designated, respectively, by 12 and 13. Preferably, as illustrated, each of the two wires 12, 13 is sent back in a U about an appendage 11a of the edge of the peripheral frame 11 so as to present the two ends adjacent to one another in electrical connection with two contacts 14 that are to be connected to electrical-supply means (not illustrated). In the deactivated condition, the shape-memory wire is in a distended condition (like the wire 13 in FIG. 2 or the wire 12 in FIG. 3). Assuming the condition of FIG. 2, electrical supply of the wire 13 causes contraction thereof. Since the wire is secured to the peripheral frame 11 in two diametrically opposite areas thereof, the shortening of the wire 13 causes the diametrically opposite areas of the peripheral frame 11, to which it is connected, to tend to line up in the same plane, with the central part of the wire in contact with the central frame 10. This brings about an axial displacement of the peripheral frame 11 up to the opposite position illustrated in FIG. 3, said movement being favoured by the diaphragm 9 itself, once the latter has exceeded its dead-centre condition. Once the condition illustrated in FIG. 3 is reached, the wire 13 can be deactivated, in so far as the elasticity of the diaphragm 9 itself tends to maintain the peripheral frame 11 in the condition illustrated in FIG. 3, set at a distance from the edge of the opening 4 of the casing 2. As has already been said, in said condition, a flow of air F coming from the internal environment can enter the casing 2 and flow out through the slits 8. When it is desired to close the opening again, it is sufficient to activate the wire 12 so as to cause a contraction thereof, which brings about the displacement of the peripheral frame 11 with respect to the central part 10 into the relative position illustrated in FIG. 2. Also during said passage, the movement is encouraged by the elasticity of the diaphragm 9 itself once it has exceeded its dead-centre configuration.

Of course, as has already been illustrated a number of times, even though the preferred example of embodiment described herein makes use of a bistable diaphragm, it would also be possible to envisage the use of a monostable diaphragm shutter element, in which shape-memory actuator means are used for moving the diaphragm away from its stable condition and elastic means are used for recalling the diaphragm into said configuration after a deactivation of the shape-memory means.

Also the conformation and arrangement of the shape-memory means can be any whatsoever, even though the one illustrated herein presents particular advantages of simplicity and efficiency.

The device according to the invention can also be used for controlling, in a variable way, the cross section of passage of a pipe, for example, for a gas. In this case it is, for example, possible to provide an annular valve body above one end of the pipe and possibly control the diaphragm shutter element in a proportional way, with a closed-loop control, as already mentioned above.

Of course, without prejudice to the principle of the invention, the details of construction and the embodiments may vary widely with respect to what is described and illustrated herein purely by of way of example, without thereby departing from the scope of the present invention.

What is claimed is:

1. A valve for gases, liquids or powdery material, comprising a diaphragm shutter element having a central part and a peripheral edge, which are mobile axially with respect to one another between a first relative end position and a second relative end position, which correspond, respectively, to the open condition and to the closed condition of the valve, or vice versa, and shape-memory actuator means for controlling the position of said central part and said peripheral edge with respect to one another wherein said shape-memory means are operatively interposed between the central part and the peripheral edge of the diaphragm and are arranged substantially parallel to the diaphragm wherein said shape-memory means comprise a first shape-memory wire and a second shape-memory wire, set on the two faces of the aforesaid diaphragm and connected in diametrically opposite areas of a second peripheral support so as to tend to modify the position of a first central support and said second peripheral support with respect to one another when they are activated.

2. The valve according to claim 1, wherein said diaphragm is monostable, it has a single stable resting configuration, corresponding to one of the aforesaid relative end positions, and in that said shape-memory means tend to move said diaphragm away from the aforesaid stable configuration, and in that elastic means are provided for recalling the diaphragm back into said stable configuration after a deactivation of the shape-memory means.

3. The valve according to claim 1, wherein said diaphragm is bistable; it has a stable resting configuration in each of the two aforesaid relative end positions and has an intermediate dead-centre position so that the diaphragm tends, as a result of its own elasticity, to move towards one of said stable configurations, when it is moved away from the other, until it exceeds the aforesaid dead-centre position.

4. The valve according to claim 3, wherein it has first and second shape-memory means for pushing the diaphragm towards said first and towards said second relative end positions, respectively.

5. The valve according to claim 1, wherein it comprises electrical-supply means for supplying said first and second shape-memory wires so as to cause an increase in the temperature thereof as a result of the passage of electric current until the respective transition temperature is exceeded.

6. The valve according to claim 5, wherein it comprises a shell or casing, with an end wall having an opening controlled by said diaphragm shutter element, said casing having an open side, in which there is mounted a frame defining a plurality of slits for exit of air, said first central support of said diaphragm shutter element being connected to said frame, and said second peripheral support being mobile axially with respect to said support between a first position in which it is in contact with the edge of the aforesaid opening so as to seal it and a position axially set at a distance from the first, in which the passage of air through said openings is enabled.

7. The valve according to claim 1, wherein there is provided a monostable diaphragm shutter element that is moved away from the resting position by means of a proportional control of the electric current supplied to the shape-memory wire, for the purpose of positioning the shutter element in a variable way, with a closed-loop control performed on the basis of a feedback signal constituted by a signal indicating a parameter such as the temperature of the wire, the position of the shutter element or of the wire, the electrical resistance of the wire, or the current supplied.

* * * * *